US008862586B2

(12) United States Patent
Young

(10) Patent No.: US 8,862,586 B2
(45) Date of Patent: *Oct. 14, 2014

(54) DOCUMENT ANALYSIS SYSTEM

(75) Inventor: Malcolm P. Young, Newcastle Upon Tyne Tyne and Wear (GB)

(73) Assignee: E-Therapeutics PLC, Newcastle Upon Tyne Tyne and Wear (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/015,832

(22) Filed: Jan. 28, 2011

(65) Prior Publication Data

US 2011/0191345 A1 Aug. 4, 2011

(30) Foreign Application Priority Data

Jan. 29, 2010 (EP) .................................. 10152093

(51) Int. Cl.
*G06F 17/30* (2006.01)

(52) U.S. Cl.
CPC ...... *G06F 17/3071* (2013.01); *G06F 17/30864* (2013.01)
USPC .......................................................... 707/739

(58) Field of Classification Search
CPC ................................................ G06F 17/30867
USPC .................... 707/739, 741, 749, 750, 999.006
See application file for complete search history.

(56) References Cited

U.S. PATENT DOCUMENTS

| | | | |
|---|---|---|---|
| 2002/0078030 A1* | 6/2002 | Iwayama et al. ................ 707/1 |
| 2005/0286414 A1* | 12/2005 | Young et al. ............... 370/216 |
| 2006/0206483 A1* | 9/2006 | Knepper et al. ................. 707/7 |
| 2007/0094251 A1* | 4/2007 | Lu et al. ......................... 707/5 |
| 2007/0143322 A1* | 6/2007 | Kothari et al. ............... 707/101 |
| 2007/0239792 A1* | 10/2007 | Chen et al. .................... 707/200 |
| 2008/0244375 A1 | 10/2008 | Gentile et al. |
| 2009/0192954 A1* | 7/2009 | Katukuri et al. ................ 706/11 |
| 2010/0082333 A1* | 4/2010 | Al-Shammari ................ 704/10 |

OTHER PUBLICATIONS

Botafogo, et al. "Structural Analysis of Hypertexts: Identifying Hierarchies and Useful Metrics", ACM Transactions on Information Systems, vol. 10, No. 2, Apr. 1992, 142-180.
EP Search Report for EP 10152093. dated Jun. 21, 2010, 7 pgs.
Tebbutt, J., "User evaluation of automatically generated semantic hypertext links in a heavily used procedural manual", Information Processing and Management, Jan. 1, 1999, 18 pgs.
Agosti, M., et al., "Design and implementation of a tool for the automatic construction of hypertexts for information retrieval", Information Processing and Management, vol. 32, No. 4, 1996, pp. 459-476.
Zhuge, H., et al., "Automatically discovering semantic links among documents", Fourth International Conference on Semantics, Knowledge and Grid, IEEE, Piscataway, NJ, Dec. 3, 2008, pp. 149-156.
Dhyani, D., et al, "A survey of web metrics", ACM Computing Surveys, vol. 34, No. 4, Dec. 2002, pp. 469-503.

* cited by examiner

*Primary Examiner* — Alexey Shmatov

(74) *Attorney, Agent, or Firm* — Brooks, Cameron & Huebsch, PLLC

(57) ABSTRACT

An information processing apparatus (5) is provided comprising: a lexicon generation module (22) operable to process a set of documents (1) to identify key words (2) present in the documents; a link generation module (24) operable to generate network data (3) linking documents which share the same or semantically related key words identified by the lexicon generation module; and a network analysis module (26) operable to associate documents with metric values based upon the patterns of connectivity of the network data generated by the link generation module. The metric values associated with documents in the set can be utilized to select documents or groups of associated documents for further processing or indexing.

16 Claims, 4 Drawing Sheets ical content. A simplistic approach to such analysis is to process a document to generate a lexicon of words and phrases which appear in the document. Such a lexicon will contain many common words which appear in most documents in the language that the document is written. As these words appear in most documents in a particular language, these common words or stop words provide little indication of the content of a document. In contrast, however, unusual or less common words will often only appear in certain contexts and hence the occurrence of such words can provide useful indication the content of a document.

DOCUMENT ANALYSIS SYSTEM

This application claims priority to EP Application No. 10152093, filed Jan. 29, 2010, the specification of which is incorporated by reference herein.

FIELD OF THE INVENTION

The present application concerns a document analysis system. In particular the present application concerns a document analysis system for analyzing unstructured documents and groups of documents.

BACKGROUND

Frequently it is desirable to process documents to summarize them or to index the documents with some kind of indication of their semantic content. A simplistic approach to such analysis is to process a document to generate a lexicon of words and phrases which appear in the document. Such a lexicon will contain many common words which appear in most documents in the language that the document is written. As these words appear in most documents in a particular language, these common words or stop words provide little indication of the content of a document. In contrast, however, unusual or less common words will often only appear in certain contexts and hence the occurrence of such words can provide useful indication the content of a document.

Where a document relates to more than one subject and the structure of a document is such that it can be divided into different parts, word frequency analysis can provide means for determining which portions of a document relate to which subjects. For less structured documents, it can be the case that frequency analysis can only identify that a document relates to multiple subjects without being able to distinguish between which portions of the document relate to which subject.

This is a particular problem when attempting to classify the content of documents generated in a piece meal manner such as website blogs. Using blogging software users are able to develop content for a website in a piece meal manner posting individual comments at different times. The individual sections may relate to the same subject or may relate to different subjects. Analyzing individual sections or postings can help to identify the content of those sections or postings themselves. However where different sections or postings relate to one another, restricting the analysis to individual postings means that relationships between individual postings can be lost.

It would be desirable to provide a means by which the content of unstructured documents could be determined. More specifically, it would be desirable to provide means by which the content of unstructured documents could be determined which provides a classification system with a better indication of the content of different portions of the document and how those portions interrelate.

SUMMARY OF THE INVENTION

In accordance with one aspect of the present application there is provided a method of processing documents comprising: processing a set of documents to identify items of semantic content present in the documents; generating network data linking documents which share the same or related items of semantic content; and associating documents with metric values based upon the patterns of connectivity of the generated network data.

In accordance with another aspect of the present invention there is provided an information processing apparatus comprising: a lexicon generation module operable to process a set of documents to identify items of semantic content present in the documents; a link generation module operable to generate network data linking documents which share the same or related items of semantic content identified by the lexicon generation module; and a network analysis module operable to associate documents with metric values based upon the patterns of connectivity of the network data generated by the link generation module.

In another aspect of the present invention there is provided a computer readable medium storing interpretable instructions which when interpreted by a programmable computer cause the computer to perform a method as described above.

BRIEF DESCRIPTION OF THE DRAWINGS

Further aspects and embodiments of the present application will become apparent with reference to the following description and accompanying drawings in which.

DETAILED DESCRIPTION

Figure 1:
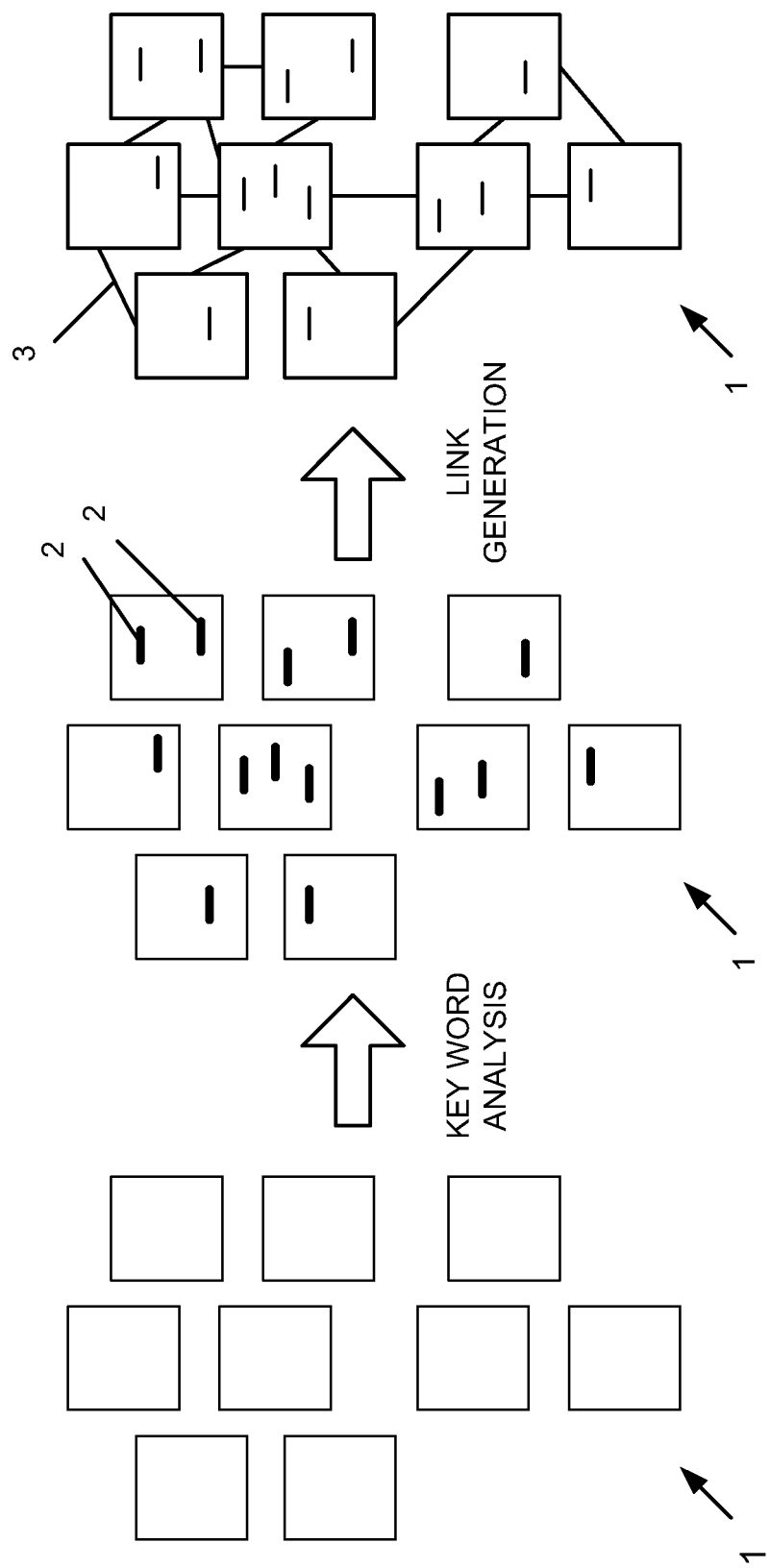
FIG. 1 is a schematic overview of document processing in accordance with an embodiment of the present invention.

Before describing a specific embodiment of the present invention, a schematic overview of the present invention will first be described with reference to FIG. 1.

The present invention relates to the indexing and analysis of documents. In accordance with the present invention, initially a set of documents 1 (illustrated by a set of rectangles in FIG. 1) is analyzed to determine the words which appear in the set of documents. Once a lexicon of words and phrases appearing in the documents 1 has been determined, the lexicon is processed to determine a set of key words 2 for the document set 1.

In this embodiment this set of key words 2 comprise words and phrases appearing in the lexicon which fulfill certain predefined criteria. More specifically these key words comprise words where the frequency with which the words or phrases appear both in the documents in the set and in documents in general is less than a predetermined threshold. Additionally the keywords 2 are filtered to remove words and phrases which appear in all the documents in the set 1 or where semantically related words appear in all the documents in the document set 1 and words which appear in only a single document in the document where no semantically related words appear in any other document.

A set of key words 2 selected in this way should be indicative of the semantic content of the documents in the document set 1. The selection of words which appear in general with less than a predetermined threshold acts to filter out very common words which appear in most documents and hence provide very little indication of the semantic content of the documents in the document set 1. Limiting the key words 2 to words which appear in at least two documents in the set or where semantically related words appear in at least two documents but which do not appear in all the documents provides a means for identifying documents in the set 1 which relate to similar topics or concern similar ideas. Finally filtering key words 2, to remove words or phrases which appear with high frequency or in all the documents means that the presence or otherwise of particular key words 2 in a document is in some way indicative of how that particular document relates to the other documents in the set 1.

Having identified a set of key words 2 the key words are then used to create network 25 data 3 from which the relationships between documents in the set 1 can be determined.

The generation of network data in this embodiment involves assigning a node number to each of the documents in the document set 1 and then generating an item of link data 3 for each pair of documents in the set of documents which contain the same or semantically related key words 2.

The result of the processing to generate link data 3 will be data defining a network of nodes representing the documents and links represented by link data 3 linking the documents together. As will be described in detail later, this generated link data can be utilized to identify important documents or groups of documents in the set. Information about the important documents or groups of documents can then be utilized to classify individual documents.

An embodiment of the present invention will now be described in greater detail with reference to FIGS. 2 and 3.

Figure 2:
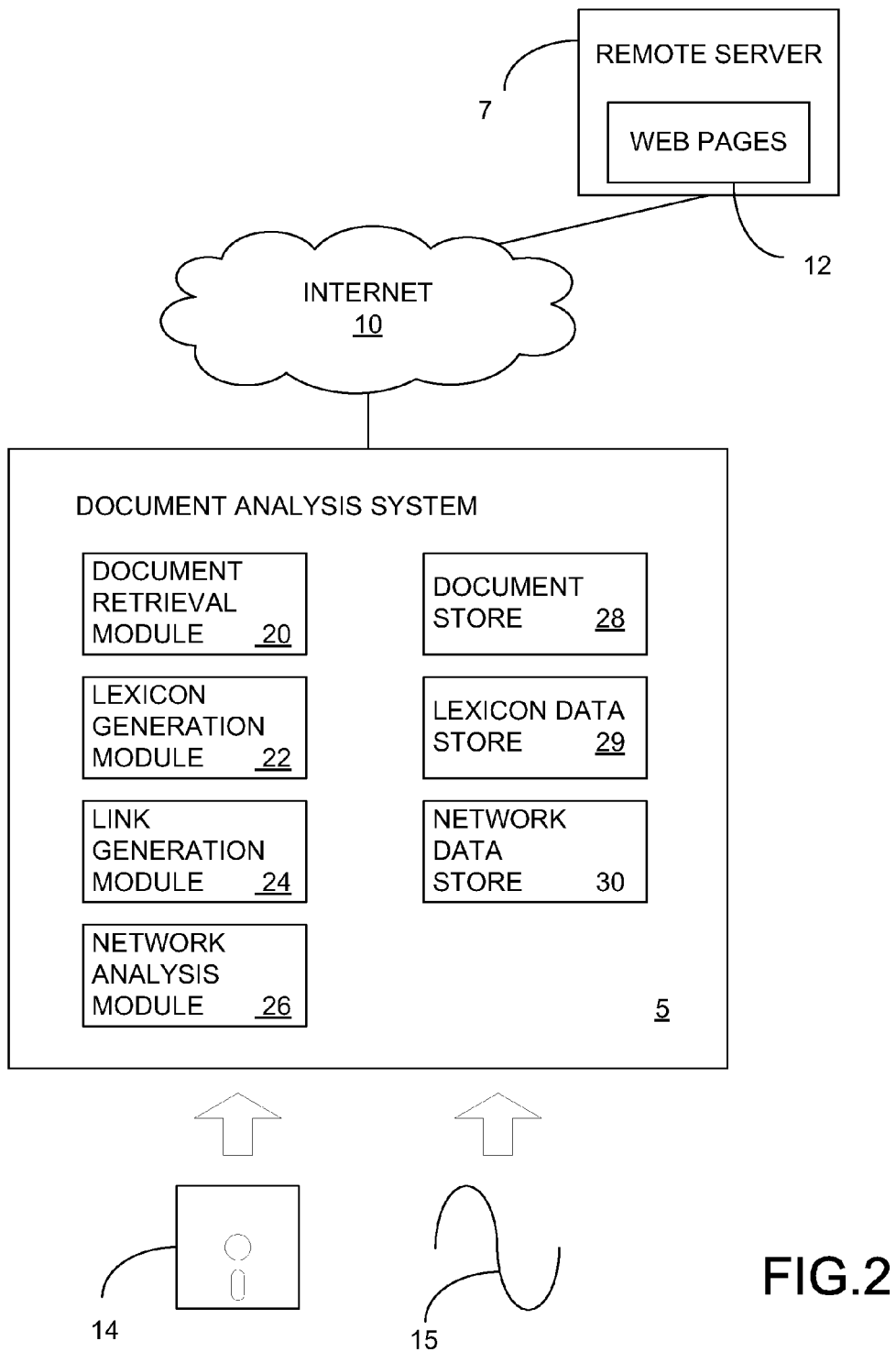
FIG. 2 is a schematic block diagram of a document analysis system in accordance with an embodiment of the present invention.

Referring to FIG. 2, a document analysis system 5 in accordance with the present embodiment comprises a programmable computer which is connected to a remote server 7 via the internet 10. Stored in the memory of the remote server 7 are a set of web pages 12 which in this embodiment are the documents that the document analysis system 5 is arranged to analyze.

In this embodiment, the document analysis system 5 is configured by software provided on a disk 14 or by receiving an electrical signal 15 via a communications network to be configured into a number of functional modules 20-30 which cause the document analysis system 5 to retrieve copies of web pages 12 stored on the remote server 7 and process the retrieved pages 12 to identify pages of importance and to classify the retrieved pages 12.

It will be appreciated that the functional modules 20-30 illustrated in FIG. 2 are purely notional in order to assist with the understanding of the working of the claimed invention and may not in certain embodiments directly correspond with blocks of code in the source code for the software. In other embodiments the functions performed by the illustrated functional modules 20-30 may be divided between different modules or may be performed by the re-use of the same modules for different functions.

In this embodiment the functional modules 20-30 comprise: a document retrieval module 20 for retrieving copies of web pages 12 from a remote server 7; a lexicon generation module 22 for processing retrieved web pages 12 to identify words and phrases appearing in retrieved web pages 12; a link generation module 24 arranged to utilize a lexicon generated by the lexicon generation module 22 to create network data for a set of retrieved web pages 12; and network analysis module 26 arranged to process generated network data to identify web pages 12 or groups of web pages of importance. In addition the memory of the document analysis system 5 is also configured to store retrieved web pages, lexicon data and network data in a document store 28, a lexicon data store and network data store 30 respectively.

The processing undertaken by the document analysis system 5 will now be described with reference to FIG. 3.

Before performing document analysis, the document retrieval module 20 of the document analysis system 5 is invoked and retrieves copies of the web pages 12 from the remote server 7 where they are stored and stores copies of the retrieved web pages 12 in the document store 28.

Figure 3:
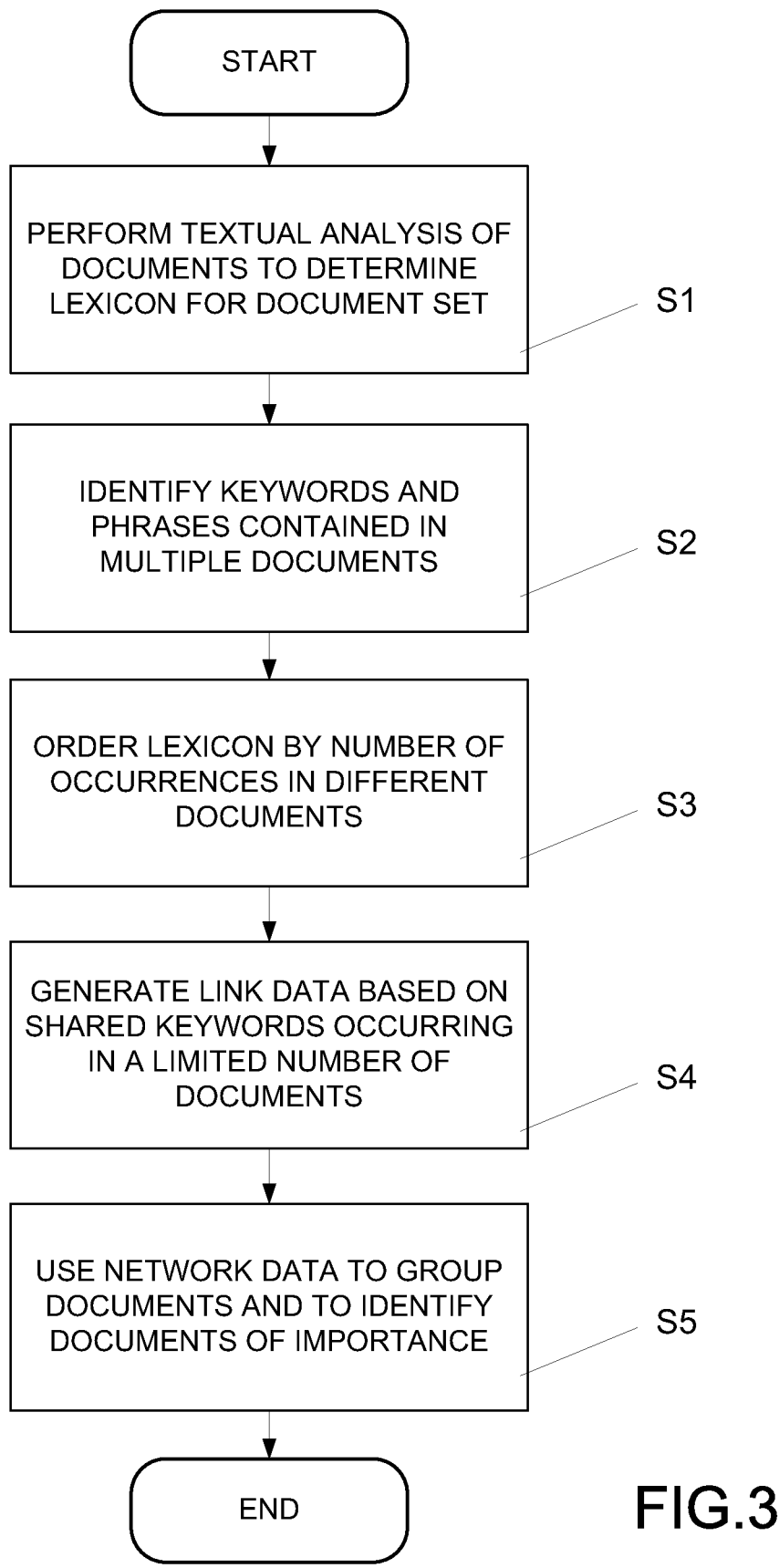
FIG. 3 is a flow diagram of the processing undertaken by the system of FIG. 2.

Turning now to FIG. 3, as an initial step in processing the retrieved web pages 12, the lexicon generation module 22 is invoked to generate (s1) a lexicon of words and phrases appearing in the retrieved web pages 12. This lexicon data is generated by processing the HTML data defining the retrieved web pages 12 to identify portions of the HTML data corresponding to text. The text is then parsed to extract words and phrases appearing in a retrieved page. Whenever a new word or phrase is extracted, from a web page, the extracted word or phrase is compared with a list of previously encountered words and phrases. If the word or phrase had not previously been encountered when processing the current set of retrieved web pages 12, a new item of lexicon data is stored in the lexicon data store 29. This will comprise the text of the newly identified word together with data identifying the web page 12 currently being processed. If, however the extracted word corresponds to the text associated with a previously generated item of lexicon data, no new data is generated. Rather, the existing item of lexicon data is updated to include a reference to the web page currently being processed if no such reference already is included in that item of lexicon data.

The result of this processing is that when all the retrieved web pages 12 have been processed, the lexicon data stored in the lexicon data store will comprise an item of lexicon data for each word or phrase appearing in the text portions of the retrieved web pages 12 together with a list of references to the web pages 12 where those specific word or phrases appear.

Having processed the web pages 12 stored in the document store 28 and generated lexicon data, the lexicon generation module 22 then processes (s2) the stored lexicon data to determine a set of key words to be used in generating network data. In this embodiment, this is achieved by filtering the generated items of lexicon data to remove any items of data corresponding to very common words which appear in most documents in a particular language.

In addition at this stage in this embodiment, the lexicon generation module 22 processes the stored lexicon data to merge data corresponding to semantically related words and phrases.

In this embodiment semantically related words are identified in two ways. Initially, each item of lexicon data is processed in turn and compared with the other 5 items of lexicon data to identify words which share the same word stem. This can be achieved using a conventional stemming algorithm.

More specifically, identification of words sharing common word stems can be achieved through a combination of rules reflecting the declensions in the language of the document being processed e.g. applying rules in English that suffixes such as 'er', 'ed', 'ing', and 'ly' should be removed to identify a root word. Special rules can be stored to identify declensions of irregular words e.g. 'run' and 'ran'

If another item of lexicon data which shares the same word stem is identified, the two items of lexicon data are merged.

By way of illustration, if items of lexicon data corresponding to the words: "fishing", "fished", "fish" and "fisher", which all share the same root word "fish", were to be encountered, the four original items of lexicon data for "fishing", "fished", "fish" and "fisher" would be replaced by a single item of lexicon data for the word stem "fish" where the replacement item of lexicon data was associated with a list of references to documents which contain any of the replaced lexicon words: "fishing", "fished", "fish" and "fisher".

By processing the lexicon data this way the lexicon data is updated so that a single item of lexicon data is stored which accounts for inflections and declensions of words appearing in the document.

Having processed the lexicon data to merge lexicon entries corresponding to words sharing the same word stems, the lexicon generation module 22 then proceeds to process the lexicon data to merge items of lexicon data corresponding to synonyms. That is to say the items of lexicon data are each considered in turn and compared with the other items of stored lexicon data to identify items of lexicon data related to different words or phrases with identical or very similar meaning e.g. 'buy' and 'purchase' or 'sick' and 'ill' etc. Whenever any such synonyms are identified, the items of lexicon data for the two synonyms are replaced by a single item of lexicon data associated with both words and a list of references to the documents 1 which contain either of the two synonyms.

One way this might be achieved is through storing data corresponding to a thesaurus to enable synonymous words to be identified.

Having merged the lexicon data for words sharing common word stems and synonymous words, the lexicon generation module then orders (s3) the items of lexicon data by the number of web pages 12 that each item of lexicon data 5 refers to. This enables the document analysis system to identify those items of lexicon data which refer to at least two web pages 12 which indicates that both pages contain the same or related words or phrases and hence may be concerned with the same topic. Ordering the items of lexicon data also enables the words which appear in many of the retrieved web pages which are therefore unlikely to be suitable for distinguishing the content of the different web pages 12 to be identified.

Having ordered the items of lexicon data, the link generation module 24 is then invoked. The link generation module 24, then proceeds to assign each of the web pages stored in the document store a node number. The link generation module 24 then processes each of the items of lexicon data associated with two web pages in turn. When processing an item of lexicon data, the link generation module 24 initially checks whether an item of network data comprising the pair of node numbers for the web pages 12 associated with the item of lexicon data is already stored in the network data store 30. If this is not the case a new item of network data is generated using the node numbers for the web pages 12 associated with the item of lexicon data and stored in the network data store 30.

When all the items of lexicon data associated with pairs of web pages 12 have been processed, the network analysis module 26 then determines whether the number of generated items of link data has reached a predetermined threshold selected on the basis of the number of web pages 12 being processed. If this is the threshold has not yet been reached, the items of lexicon data associated with three web pages are processed and link data for each combination of pairs of nodes associated with an item of lexicon data are generated in a similar manner as has been described above. This process is repeated for items of lexicon data associated with increasing numbers of web pages until the number of items of link data exceeds the selected threshold.

By processing the items of lexicon data in this way the link generation module 24 generates a set of network data where each of the retrieved web pages 12 in the document store corresponds to a node and links between the nodes are indicative of the same words or phrases appearing in linked web pages. Further the processing of the lexicon data in the manner described also means that the generated links between web pages 12 only arise where the language used comprises less frequently used words and hence is more likely to be indicative of the linked web pages 12 having related semantic content.

After network data for a set of retrieved web pages has been generated, the document analysis system then (s5) invokes the network analysis module 26 which processes the network data to identify relationships between the web pages 12 thereby by identifying related groups of web pages and/or web pages of importance.

Figure 4:
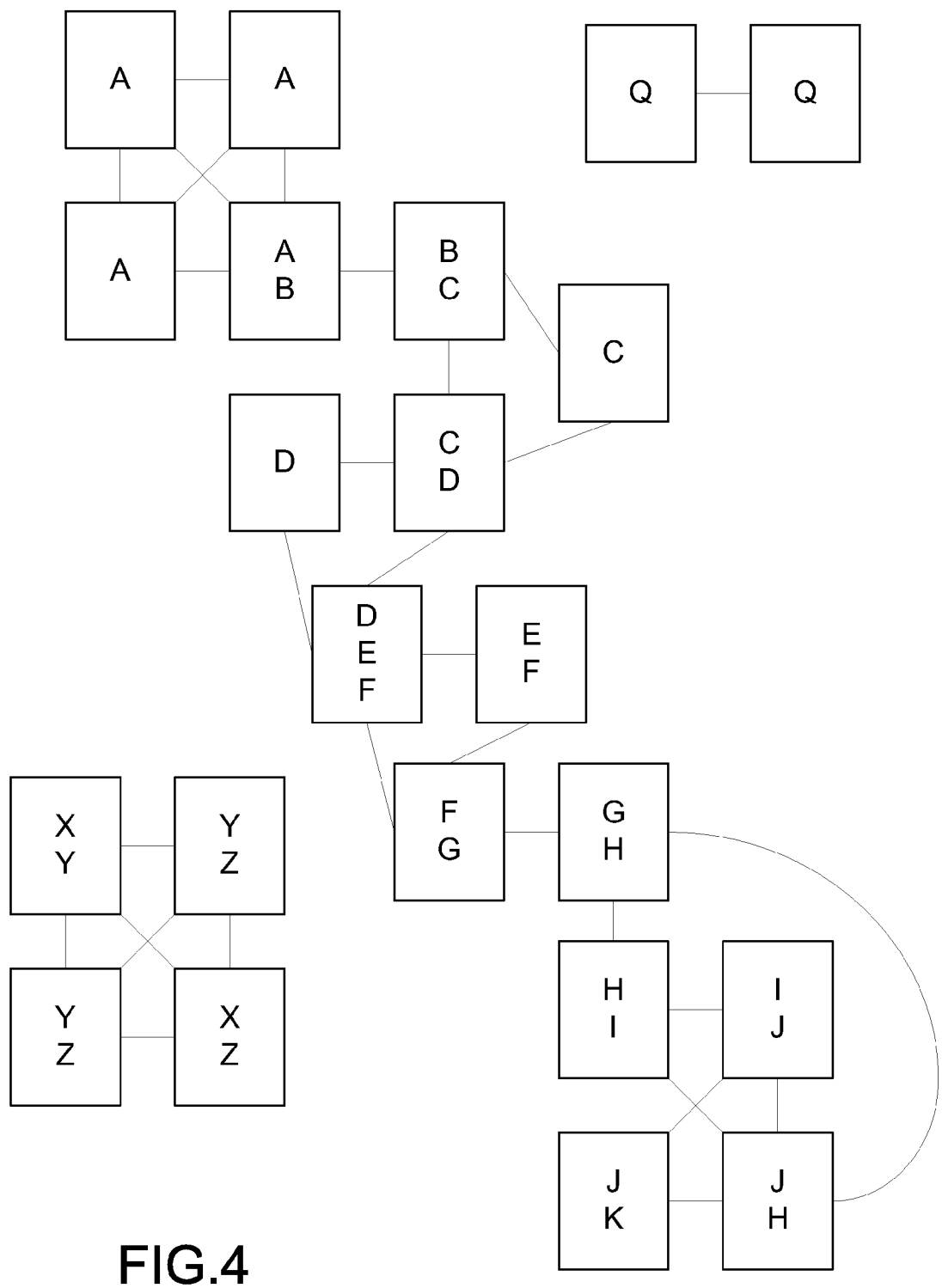
FIG. 4 is a schematic illustration of a set of documents interconnected by link data to illustrate the processing undertaken in accordance with the present invention.

FIG. 4 is an exemplary schematic illustration of network data for a set of documents. In FIG. 4 each of the documents is represented by a rectangle where the key words or phrases in the documents are represented by letters and a line between two rectangles illustrates the existence of link data linking two documents because two documents include the same or related key words or phrases. This is because due to the pre processing of lexicon data described above to merge lexicon data related to words sharing the same word stem and synonyms, that documents have keywords in common may not necessarily mean that both documents contain exactly the same keyword. Rather, the presence of a common key word indicates that two documents either contain copies of the same word or phrase or contain semantically related words sharing the same word stem or synonymous words or phrases.

Looking at FIG. 4 a number of relationships between the content of the illustrated documents becomes apparent. In the example of FIG. 4 it is apparent that the link data acts to sort the documents into three groups: a main group; a pair of documents containing the key word or related words represented by the letter Q; and a set of 4 documents associated with the key words or related words X, Y and Z. From the illustrated network data it is apparent that these groups of documents do not have key words in common and hence it is likely that the groups of documents relate to different subjects.

Further considering the main group in detail, it will be apparent that whereas all the documents in the main group share key words or related words or phrases with at least one other document in the main group, the main group can itself be divided into a number of sub-groups sharing key words or related words. It will also be appreciated that removal of certain documents from the main group would cause the main group to divide into separate groups.

Each of the above features of the network illustrated in FIG. 4 can be identified visually and can also be extracted from the network data through appropriate processing of the link data. Further it will also be appreciated that the relationships 5 between documents described above have a relationship with the semantic meaning of the illustrated documents which the processing of network data can extract from the document set.

Further it will be appreciated that different network metrics correspond to different semantic relationships. Thus for example in the case of the documents illustrated in FIG. 4 it is apparent that the key words or phrases D, E and F correspond to documents which are in the centre of the main group of documents. In the illustrated example, this would serve to indicate that the content of these documents are more representative of the main group than say for example the content of the documents at the periphery of the main group such as the documents containing the key word A.

Thus in accordance with the present embodiment, once network data has been generated, the network analysis module 26 proceeds (s5) to process the network data to determine a number of network metrics.

The generated metrics could be determined in a number of different ways. One approach would be to attempt to determine the extent to which a document is representative of the set of documents directly from the pattern of links themselves.

Thus for example a simple network metric that could be determined would be to identify the number of links that are associated with a particular document. This would provide an indication of the number of other documents which include key words which are shared with that particular document. Where this value was relatively high, that would indicate that the document in question was relatively representative of the group of documents a whole.

An alternative approach would be to rank the documents utilizing a ranking scheme such as the conventional PageRank™ algorithm such as is described in U.S. Pat. No. 6,285,999. In such a system after assigning all documents an initial ranking value, a page rank value is calculated in an iterative manner by updating the initial value for a document based on the sum of the ranking values for documents linked to that document as represented by the stored link data divided by the number of links in those documents.

More specifically the page rank assigned to a document A linked to documents B, C, D etc is calculated as:

$$PR(A) = \frac{1-d}{N} + d\left(\frac{PR(B)}{L(B)} + \frac{PR(C)}{L(C)} + \frac{PR(D)}{L(D)} + \ldots\right).$$

where PR(u) is the page rank value assigned to document u, L(u) is the number of links to document u, N is the total number of documents for which the Page Rank values are being calculated and d is a damping factor. The result of such a calculation after a number of iterations approximates the probability of an individual arriving at a particular document when randomly following links and hence the higher values are assigned to better linked documents and hence higher values will be associated with more representative documents.

Alternatively rather than deriving a ranking value directly from the ranking values of documents and the link data associated with the documents, a two step process such as the Hyperlink-Induced Topic Search (HITS) algorithm could be used.

In such a system, initially all nodes are assigned a hub and an authority score of 1. These scores are then iteratively updated with each node's authority score being set to be equal to the sum of the Hub Scores for all nodes containing links which point to that node. Nodes hub scores are then updated to be equal to the sum of the authority scores of each node associated the links associated with the node point to. The updated hub and authority scores are then normalized by dividing each hub score by the sum of the squares of all the hub scores and by dividing each authority score by the sum of the squares of all the authority scores. The final hub and authority scores are then those achieved after performing a set number of iterations. Again with such a system better connected and hence more representative documents will become associated with higher ranking values.

An alternative metric for determining the extent to which a document is representative of a group of documents is to utilize the link data to determine a distance measure based on the number of links in the shortest paths connecting a document to other documents in the set.

More specifically, an indication of how well connected and hence how representative a document is to the rest of a set of documents can be determined by considering the average or the maximum shortest distance to or from all documents which are connected to a particular document based on the generated link data. In this context distance means the smallest number of links that have to be traversed to link between two documents.

Where a document is poorly connected to the other documents in the set this may result in particularly high values because of the limited connection of the document to the rest of the document set or particularly low values because only a small subset of the documents are connected to the document of interest by any means. Thus either very high or very low values may indicate that a particular document is unlikely to be of representative of the set of documents as a whole.

It will be appreciated that when calculating a maximum shortest distance based on network data, it is necessary to calculate shortest distance values for all nodes in a network. However, a reasonable approximation of an average shortest distance value can be obtained just by determining values for a sample of nodes. The appropriate size of the sample will depend up the level of connectivity of the network in question.

A further potential metric for measuring the relevance and likely importance of a document is to determine the extent that a document is within a tightly connected portion of the document set. Such a measure enables poorly referenced documents to be identified which themselves are unlikely to be representative.

A simple approach to obtaining a centrality measurement is to determine the extent to which documents linked to a particular document of interest are themselves interconnected. This can be achieved by identifying the links associated with a particular node to identify a set of nodes of interest. The extent that links exist between the nodes in the set can then be calculated. If the number of interconnected nodes is high relative to the total number of possible interconnections, this then indicates that the original node is in a portion of the document set which is highly interconnected which suggests that the web page associated with a node is at the centre of a group of nodes concerned with the same subject matter.

More sophisticated algorithms can provide measures of the centrality of a document within a document set which reflect the extent to which all documents in a neighborhood are themselves well connected to the document set.

Thus for example initially all the documents in the document set could be ordered by the number of links associated with that page. All documents associated with only one link could be assigned a value of 1 indicating that such pages are at the periphery of the network.

Documents associated with two links would then be examined and assigned a value of 1 if either of the pages linked to has already been associated with a value 1 or a value 2 otherwise.

The remaining documents would then be processed in turn based on the ordered list ordered by the number of links associated with the documents. For each document, the document could assigned a ranking value N being the highest number for the number of links to documents assigned already assigned a value of N or for which no value had yet been assigned.

Thus for example when processing documents having 3 links, those pages linking to documents previously assigned a value of 1 would themselves be assigned a value of one, those documents linking only to documents previously assigned a value 2 would themselves be assigned a value of 2 whereas documents with 3 links to or from only documents assigned the value of 3 or not yet assigned a value would be given a ranking value of 3.

In this way documents would be assigned a ranking value indicative of the extent that a document was well connected to documents which themselves are well connected. Poorly connected and poorly referenced documents are most likely to be less representative of the document set as a whole. In contrast, documents well connected to other documents which are themselves well referenced web pages are likely to be more representative of the document set as a whole.

An alternative approach to identifying well connected and well referenced documents would be to start by associating all documents associated with three or more links to 1. The values associated with documents could then be updated by iteratively incrementing the value associated with a document by one at each iteration where the document was linked only to other documents associated with a value equal to or higher than the current iteration number and repeating this process until the values of no documents where being increased in the course of an iteration. Assigning a value to documents in such a way results in a similar ranking of documents to that using the previously described approach with poorly connected and poorly referenced documents being assigned a low value and well referenced documents referenced by similarly well connected documents being associated with a high value.

In addition or as an alternative to determining metrics indicative of the extent to which individual documents in a document set provide a link between otherwise poorly connected portions of the document set. A number of different approaches for identifying linking nodes or groups of nodes are disclosed in U.S. Pat. No. 7,466,663 "Method and apparatus for identifying components of a network having high importance for network integrity" which is hereby incorporated by reference.

Thus for example U.S. Pat. No. 7,466,663 discloses algorithms for determining the proportions of paths between nodes which pass through a particular node. This is achieved by generating a list of nodes connected by links to a particular node and then determining all the paths of up to a certain length linking pairs of nodes in the list. The proportion of paths including a reference to the node of interest can then be determined. When applied to a set of documents and generated link data in accordance with the present application identifying such nodes results in identifying documents which include words or phrases which link otherwise disparate portions of the document set.

U.S. Pat. No. 7,466,663 also discloses algorithms to determining the nodes which provide bridges between otherwise unconnected portions of a network. This is achieved by associating nodes with co-ordinate data and then modifying the co-ordinate data so that nodes connected by links are associated with co-ordinates which are closer together and nodes which are not connected to each other are further apart. The length measures of the distances between linked nodes then provides a measure of the extent links provide bridges to otherwise unconnected portions of the network. Applying such an algorithm to network data generated in accordance with the present application would enable words or phrases shared between otherwise apparently unrelated portions of a document set to be identified.

In addition to describing algorithms for identifying individual nodes providing bridges between otherwise unconnected or poorly connected portions of a network U.S. Pat. No. 7,466,663 also describes algorithms for identifying groups of nodes providing connections between otherwise unconnected or poorly connected portions of a network. This is achieved by assigning nodes into a number of groups and then swapping nodes between groups so that nodes sharing connections are assign to the same group. Processing network data in this way acts to divide the nodes into a number of groups of nodes sharing connections. Nodes linked to nodes in differ groups can be identified as providing bridges between otherwise poorly connected or unconnected portions of a network.

The application of such an algorithm to network data generated in accordance with the present invention would enable documents in a set of documents to be divided into a number of groups where the groups of documents related words or phrases. This would enable groups of documents containing words or phrases which provide a link between groups of documents which otherwise do not have words or phrases in common to be identified.

Having processed the link data to associate documents with metric values based on the patterns of connectivity of indicated by the link data, the metric values can then be utilized in various ways to identify documents or groups of documents within the document set. Further analysis of the identified documents or groups of documents could then be performed. Processing documents in such away would enable better indexing of documents in a set to be achieved as the division of documents for analysis into sub-groups or the selection of individual documents as being representative of a set of documents avoids errors arising where unrelated documents are erroneously considered as being related.

Thus for example based on appropriate metric measures, the group of documents could be divided into a number of sub-groups of linked and hence associated documents. The content of individual sub-groups of documents could then be analyzed and indexed. Such a division of documents prior to indexing would enable the content to be better indexed as it would avoid documents being indexed on the basis of the content of unrelated documents which happen to be present in a particular document set.

Alternatively, individual documents could be identified on the basis of the network metrics as being likely to be representative of a group or a sub-group of documents. Where such processing where to occur, it would be possible to categorize or index the group or sub-group solely on the basis of such representative documents and thereby avoid categorization of the group based upon an unrepresentative document.

Alternatively, the network metrics could be utilized to identify documents which provide a link between otherwise largely unconnected sub-groups of documents. Where link data is generated in the manner described above such sub-groups are likely to be documents relating to different subjects and hence the identified documents are likely to be representative of the link between two subjects.

Further Modifications and Embodiments

In the above described embodiment link data is described as being generated on the basis of pairs of documents containing shared or related key words. It will be appreciated that in other embodiments other criteria could be used to generate link data. Thus for example rather than generating an item of link data whenever a two documents share a related key words, link data could be generated only where two documents share at least a predetermined number of key words. Alternatively an item of link data could be generated for each key word shared by two documents. This would lead to the generation of network data where documents were linked by multiple items of link data where the number of items of link data represents the number of shared key words. Network metrics could then be generated on the basis of such network data.

Although in the above described embodiment the processing of HTML web pages has been described, it will be appreciated that the above described system can process any kind of electronic document which can be processed to identify different items of semantic content such as words and phrases. Where a document or a set of documents are not available electronically, the documents could be converted into electronic documents prior to processing. Similarly where documents are in a form which does not allow easy extraction of individual items of text, e.g. certain pdf formats, the documents in question could be pre-processed using for example a character recognition program to convert the document to searchable text.

Although in the above embodiment a system has been described which processes lexicon data to identify words sharing the same word stem and to identify synonyms, it will be appreciated in other embodiments no such processing need take place. In such embodiments, the generation of link data would then be such as to link documents which contain exactly corresponding words or phrases.

Alternatively, instead of processing lexicon data to identify synonyms and words sharing common word stems, other types of processing might be undertaken. Thus for example in some embodiments determination of other types of semantic similarity might be used to identify related words.

Although in the above embodiment link data is described as being generated until a threshold amount of network data has been generated, it will be appreciated that in other embodiments, the generation of network data could be limited in other ways. Thus for example network data might be generated for all identified key words which fulfill certain criteria.

Although in the above embodiment a document analysis system 5 is described which is arranged to process web pages 12 stored on a remote server 7, it will be appreciated that the present invention could be applied to any suitable set of documents. In particular, it will be appreciated that a set of documents suitable for processing could be generated by dividing a larger document into a number of parts to create a set of documents as an alternative to processing a set of documents which already comprises a number of individual separate parts. Further, it will be appreciated that documents for processing could come from a variety of sources other than web pages. Thus for example written documents might be scanned in to generate electronic copies for processing.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier can be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means. When a program is embodied in a signal which 5 may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

What is claimed is:

1. A non-transitory computer readable medium storing computer interpretable instructions which when interpreted by a programmable computer cause the computer to:
   process a set of documents to identify items of semantic content present in the documents, wherein the items of semantic content are identified by appearing less than a predetermined threshold number of times and filtering out those items that appear in all the documents in the document set;
   associate each of the documents in the set with a node number;
   generate network data linking nodes associated with documents which share same or related items of semantic content;
   process the generated network data to generate metric values for each of the nodes based upon patterns of connectivity of links between the nodes as indicated by the generated network data; and
   utilize the generated metric values to select one or more documents from the set of documents as being representative of the contents of the set.

2. An information processing apparatus comprising:
   a processor; and
   a memory, the memory having stored therein;
   a lexicon generation module operable to process a set of documents to identify items of semantic content present in the documents, wherein the items of semantic content are identified by appearing less than a predetermined threshold number of times and filtering out those items that appear in all the documents in the document set;
   a link generation module operable to generate network data linking documents which share same or related items of semantic content identified by the lexicon generation module by:
      associating each of the documents in the set of documents processed by the lexicon generation module with a node number; and
      generate link data linking the nodes associated with documents which share the same or related items of semantic content; and
   a network analysis module operable to process network data generated by the link generation module to determine metric values for each of the nodes in the generated network based upon patterns of connectivity of links between the nodes as indicated by the network data generated by the link generation module; and
   utilize the determined metric values to select one or more of the documents from the set of documents as being representative of the content of the set.

3. A method of processing documents comprising:
   processing a set of documents to identify items of semantic content present in the documents, wherein the items of semantic content are identified by appearing less than a predetermined threshold number of times and filtering out those items that appear in all the documents in the document set;
   generating network data linking documents which share same or related items of semantic content by:
   associating each of the documents in the set with a node number;
   generating link data linking nodes associated with documents which share the same or related items of semantic content;

processing the generated network data to determine metric values for each of the nodes in the generated network data based upon patterns of connectivity of links between the nodes of the generated network data; and utilizing the determined metric values to select one or more of the documents from the set of documents as being representative of the content of the set.

4. The method of claim 3, wherein processing the set of documents to identify items of semantic content present in the documents comprises:

identifying words or phrases appearing in the set of documents; and filtering the identified words or phrases to remove words or phrases corresponding to words or phrases appearing with greater than a predetermined frequency.

5. The method of claim 4, further comprising filtering the identified words or phrases to remove words or phrases which appear in all the documents in a document set.

6. The method of claim 4, wherein generating the link data linking nodes associated with the documents which share the same or related items of semantic content comprises:

identifying words or phrases appearing in the set of documents which are synonymous or which share common word stems; and generating link data linking nodes associated with the documents which contain words or phrases which are synonymous or share the word stems.

7. The method of claim 3, wherein generating the link data linking nodes associated with the documents which share the same or related items of semantic content comprises:

associating each of the documents in the set of documents with a node number; and generating an item of link data comprising a pair of node numbers associated with documents where said documents contain the same or related items of semantic content.

8. The method of claim 7, wherein generating items of the link data comprises:

ordering the items of semantic content on the basis of the number of documents which contain the related items of semantic content; and successively generating link data for related items of semantic content included in increasing numbers of documents in the document set until a predetermined amount of link data has been generated.

9. The method of claim 3 wherein processing the generated network data to determine the metric values for each of the nodes in the generated network based upon the patterns of connectivity of links between the nodes as indicated by the generated link data comprises:

processing the link data to generate metric values indicative of an extent to which removal of a node associated with a document reduces the level of connectivity of the network defined by network data.

10. The method of claim 3 wherein processing the generated network data to determine the metric values for each of the nodes in the generated network based upon the patterns of connectivity of links between the nodes as indicated by the generated link data comprises:

processing the link data to generate metric values indicative of an extent to which a proportion of paths between the nodes in the network pass via a particular node associated with a document.

11. The method of claim 3 wherein processing the generated network data to determine the metric values for each of the nodes in the generated network based upon the patterns of connectivity of links between the nodes as indicated by the generated link data comprises:

processing the link data to generate metric values indicative of a minimum path length between a node associated with a document and other nodes associated with documents in the document set.

12. The method of claim 3 wherein processing the generated network data to determine the metric values for each of the nodes in the generated network based upon the patterns of connectivity of links between the nodes as indicated by the generated link data comprises:

processing the link data to generate metric values indicative of an average number of links required to navigate from a node to any of the other nodes in the network.

13. The method of claim 12 wherein processing the link data to generate the metric values indicative of the average number of links required to navigate from the node to any of the other nodes in the network comprises:

associating documents linked to at least a threshold number of other documents with a value; and iteratively incrementing the values associated with documents linked only with documents associated with values in excess of the current iteration number until no values are updated during an iteration.

14. The method of claim 3 wherein processing the generated network data to determine the metric values for each of the nodes in the generated network based upon the patterns of connectivity of links between the nodes as indicated by the generated link data comprises:

associating each of the documents with a value wherein the value is:

indicative of a number of other documents linked to that document, if none of the links associated with the document link to documents which have previously been processed and associated with a value; or indicative of a greatest number associated with a document previously processed and associated with a value which is linked to the current document by a link where the current document is linked to at least that number of documents associated with such a value or which have not yet been processed and associated with a value.

15. The method of claim 3 further comprising:

utilizing the associated metric values to divide the set of documents into a number of sub-groups of documents; and utilizing the determined metric values to select one or more documents as documents representative of identified groups.

16. The method of claim 3 further comprising:

indexing documents in the set of documents on the basis of the identified representative documents.

* * * * *